US010663641B2

(12) United States Patent
Wang et al.

(10) Patent No.: US 10,663,641 B2
(45) Date of Patent: May 26, 2020

(54) DISPLAY PANEL AND DISPLAY DEVICE

(71) Applicant: BOE TECHNOLOGY GROUP CO., LTD, Beijing (CN)

(72) Inventors: Wei Wang, Beijing (CN); Yafeng Yang, Beijing (CN); Xiaochuan Chen, Beijing (CN); Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 320 days.

(21) Appl. No.: 15/750,655

(22) PCT Filed: Sep. 19, 2017

(86) PCT No.: PCT/CN2017/102148
§ 371 (c)(1),
(2) Date: Feb. 6, 2018

(87) PCT Pub. No.: WO2018/076961
PCT Pub. Date: May 3, 2018

(65) Prior Publication Data

US 2020/0064532 A1 Feb. 27, 2020

(30) Foreign Application Priority Data

Oct. 24, 2016 (CN) .......................... 2016 1 0924491

(51) Int. Cl.
*F21V 8/00* (2006.01)
*G02F 1/1335* (2006.01)
(Continued)

(52) U.S. Cl.
CPC ........... *G02B 6/005* (2013.01); *G02F 1/1337* (2013.01); *G02F 1/1343* (2013.01);
(Continued)

(58) Field of Classification Search
CPC ............. G02F 1/133528; G02F 1/1337; G02F 2001/133746; G02F 2001/133749;
(Continued)

(56) References Cited

U.S. PATENT DOCUMENTS 6,999,156 B2 2/2006 Chou et al.
2004/0120644 A1 6/2004 Chou et al.
(Continued)

FOREIGN PATENT DOCUMENTS

CN 101329463 A 12/2008
CN 101968595 A 2/2011
(Continued)

OTHER PUBLICATIONS

Office Action for CN Application No. 201610924491.8, dated Apr. 28, 2017, 10 pages.
(Continued)

*Primary Examiner* — Jia X Pan
(74) *Attorney, Agent, or Firm* — Arent Fox LLP; Michael Fainberg

(57) ABSTRACT

The disclosure provides a display panel and a display device. The display panel includes an upper substrate (001) and a lower substrate (002) arranged opposite to each other, a liquid crystal layer (003), a waveguide layer (004), a plurality of grating coupling structures (005), and a plurality of electrode structures (006). The liquid crystal layer (003) is arranged between the upper substrate (001) and the lower substrate (002), and liquid crystal molecules in the liquid crystal layer (003) have a refractive index no with respect to o-polarized light, and a refractive index ne with respect to e-polarized light; the waveguide layer (004) is arranged on a side of the lower substrate (002) facing the upper substrate (001), and a refractive index of the waveguide layer (004) is at least greater than a refractive index of a film layer in
(Continued)

contact with the waveguide layer (004); the plurality of grating coupling structures (005) are arranged and arrayed on a surface of the waveguide layer (004) on a side thereof facing the upper substrate (001); and the plurality of electrode structures (006) are arranged on sides of the grating coupling structures (005) facing the upper substrate (001) and are in correspondence to the grating coupling structures (005) in a one-to-one manner. The display and the display device can control a display grayscale.

19 Claims, 3 Drawing Sheets

(51) Int. Cl.

| | |
|---|---|
| ***G02F 1/1337*** | (2006.01) |
| ***G02F 1/13357*** | (2006.01) |
| ***G02F 1/1343*** | (2006.01) |

(52) U.S. Cl.
CPC .. *G02F 1/133528* (2013.01); *G02F 1/133615* (2013.01); *G02F 2001/133562* (2013.01); *G02F 2001/133746* (2013.01); *G02F 2001/133749* (2013.01)

(58) Field of Classification Search
CPC ... G02F 2001/133562; G02F 1/133615; G02B 6/005
See application file for complete search history.

(56) References Cited

U.S. PATENT DOCUMENTS

| | | | | |
|---|---|---|---|---|
| 2005/0237475 | A1 | 10/2005 | Chou et al. | |
| 2010/0207964 | A1* | 8/2010 | Kimmel | G02B 6/0036 345/690 |
| 2012/0092590 | A1* | 4/2012 | Shestak | G02F 1/133504 349/62 |
| 2016/0091775 | A1* | 3/2016 | Gibson | G02F 1/313 349/186 |
| 2016/0154291 | A1* | 6/2016 | Gibson | G02F 1/139 349/33 |
| 2019/0033507 | A1* | 1/2019 | Wang | G02B 6/0036 |

FOREIGN PATENT DOCUMENTS

| | | | |
|---|---|---|---|
| CN | 103278958 | A | 9/2013 |
| CN | 205281025 | U | 6/2016 |
| CN | 106291943 | A | 1/2017 |
| CN | 206096638 | U | 4/2017 |
| CN | 206096710 | U | 4/2017 |
| WO | 2014081415 | A1 | 5/2014 |
| WO | 2015016842 | A1 | 2/2015 |

OTHER PUBLICATIONS

International Search Report for CN Application No. PCT/CN2017/102148, dated Nov. 29, 2017, 7 pages.

* cited by examiner

DISPLAY PANEL AND DISPLAY DEVICE

Cross-Reference to Related Applications

This application is a National State of International Application No. PCT/CN2017/102148, Filed Sep. 19, 2017, which claims priority to Chinese Patent Application No. 201610924491.8, filed Oct. 24, 2016, both of which are hereby incorporated by reference in their entireties.

TECHNICAL FIELD

Embodiments of this disclosure relate to a display panel and a display device.

BACKGROUND

At present, existing virtual/augmented reality displays and transparent displays are typically implemented using traditionally structured Liquid Crystal Display (LCD) panels and Organic Light emitting Display (OLED) panels, so it is difficult to provide the display panels with high transparency, thus degrading the transmittance of light rays behind the panels, and a spectrum to be transmitted.

Furthermore as there is a growing display definition as required, there is also a growing demand of display devices with a high Pixels Per Inch (PPI), but it is difficult to develop the display devices with a high PPI because they are restricted by their fabrication processes.

Moreover emergent light rays of the traditionally structured Liquid Crystal Display (LCD) panels and Organic Light emitting Display (OLED) panels are generally divergence light rays, thus making it difficult to achieve a near-to-eye display with monocular focus.

SUMMARY

At least one embodiment of the disclosure provides a display panel, the display panel includes an upper substrate and a lower substrate arranged opposite to each other, a liquid crystal layer, a waveguide layer, a plurality of grating coupling structures, and a plurality of electrode structures. The liquid crystal layer is arranged between the upper substrate and the lower substrate, and liquid crystal molecules in the liquid crystal layer have a refractive index no with respect to o-polarized light, and a refractive index ne with respect to e-polarized light; the waveguide layer is arranged on a side of the lower substrate facing the upper substrate, and a refractive index of the waveguide layer is at least greater than a refractive index of a film layer in contact with the waveguide layer; the plurality of grating coupling structures are arranged and arrayed on a surface of the waveguide layer on a side thereof facing the upper substrate; and the plurality of electrode structures are arranged on sides of the grating coupling structures facing the upper substrate and are in correspondence to the grating coupling structures in a one-to-one manner.

For example, in the display panel according to an embodiment of the disclosure, each of the grating coupling structures includes a plurality of grating strips arranged at an interval, and slits arranged between two adjacent ones of the grating strips; and each of the electrode structures includes a plurality of electrode strips, wherein the electrode strips correspond to grating strips of a corresponding grating coupling structure of the each of the electrode structures in a one-to-one manner, and a width of each electrode strip is not greater than a width of each grating strip.

For example, in the display panel according to an embodiment of the disclosure, the refractive indexes of the grating strips are n, wherein n is equal to no, ne, or any value between no and ne.

For example, in the display panel according to an embodiment of the disclosure, each of the electrode structures includes an electrode strip configured to load a positive electric signal, and an electrode strip configured to load a negative electric signal; and the electrode strip configured to load a positive electric signal and the electrode strip configured to load a negative electric signal are arranged alternately.

For example, in the display panel according to an embodiment of the disclosure, a sum of a thickness of each grating coupling structure and a thickness of each electrode structure is not greater than the width of each grating strip.

For example, in the display panel according to an embodiment of the disclosure, the thickness of each grating coupling structure ranges from 100 nm to 1 μm; a material of each electrode structure is a transparent conductive material, and the thickness of each electrode structure ranges from 50 nm to 1000 nm; or each electrode structure is made of a metal material, and the thickness of each electrode structure ranges from 30 nm to 200 nm.

For example, in the display panel according to an embodiment of the disclosure, spacing between two adjacent ones of the electrode strips is less than spacing between the electrode strips and the upper substrate in a direction perpendicular to the upper substrate.

For example, in the display panel according to an embodiment of the disclosure, the display panel further includes a buffer layer arranged between the waveguide layer and the lower substrate.

For example, in the display panel according to an embodiment of the disclosure, the buffer layer is in contact with the waveguide layer, and a refractive index of the buffer layer is less than the refractive index of the waveguide layer.

For example, in the display panel according to an embodiment of the disclosure, the buffer layer is in contact with the lower substrate, and the refractive index of the buffer layer is greater than a refractive index of the lower substrate.

For example, in the display panel according to an embodiment of the disclosure, a thickness of the buffer layer ranges from 50 nm to 10 μm.

For example, in the display panel according to an embodiment of the disclosure, a thickness of the waveguide layer ranges from 100 nm to 100 μm.

At least one embodiment of the disclosure further provides a display device including the display panel above, and a collimating backlight structure at least arranged on one side of the waveguide layer, wherein collimated backlight exit from the collimating backlight structure.

For example, in the display device according to an embodiment of the disclosure, the collimated backlight is light into which monochromatic light emitted from at least three types of monochromatic laser devices is mixed; or the collimated backlight is light into which monochromatic light emitted from at least three types of monochromatic light emitting diodes is mixed by a collimating structure; or the collimated backlight is white light, emitted by a white light emitting diode, which is collimated by the collimating structure; or the collimated backlight is collimated light into which light emitted by a strip-shaped cold cathode fluorescent lamp is collimated by the collimating structure.

For example, in the display device according to an embodiment of the disclosure, the collimated backlight is incident into the waveguide layer perpendicular to the side of the waveguide layer, or incident into the waveguide layer at an inclination angle satisfying a total reflection condition in the waveguide layer.

For example, in the display device according to an embodiment of the disclosure, refractive indexes of grating strips of the grating coupling structures are no; the display device further includes an alignment layer arranged on a surface of the upper substrate on a side thereof facing the liquid crystal layer, and/or on surfaces of the electrode structures on sides thereof facing the liquid crystal layer; and initial orientations of liquid crystal molecules in the liquid crystal layer are perpendicular to the upper substrate and the lower substrate.

For example, in the display device according to an embodiment of the disclosure, refractive indexes of grating strips of the grating coupling structures are ne, or any value between no and ne; the display device further includes an alignment layer arranged on a surface of the upper substrate on a side thereof facing the liquid crystal layer, and/or on surfaces of electrode structures on sides thereof facing the liquid crystal layer, and a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light; and initial orientations of liquid crystal molecules in the liquid crystal layer are perpendicular to the upper substrate and the lower substrate.

For example, in the display device according to an embodiment of the disclosure, the display device further includes an alignment layer arranged on a surface of the upper substrate on a side thereof facing the liquid crystal layer, and/or on surfaces of the electrode structures on sides thereof facing the liquid crystal layer, and a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light; and initial orientations of liquid crystal molecules in the liquid crystal layer are parallel to the upper substrate and the lower substrate.

For example, in the display device according to an embodiment of the disclosure, refractive indexes of grating strips of the grating coupling structures are any value between no and ne; and liquid crystal molecules in the liquid crystal layer are of a blue phase liquid crystal material.

For example, in the display device according to an embodiment of the disclosure, refractive indexes of grating strips of the grating coupling structures are no or ne; liquid crystal molecules in the liquid crystal layer are of a blue phase liquid crystal material; and the display device further includes a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light.

BRIEF DESCRIPTION OF THE DRAWINGS

In order to make the technical solutions in the embodiments of the disclosure more apparent, the drawings in the embodiments will be introduced below in brief, and apparently the drawings to be described below are merely illustrative of some embodiments of the disclosure, but not intended to limit the disclosure thereto.

and

Figure 6A:
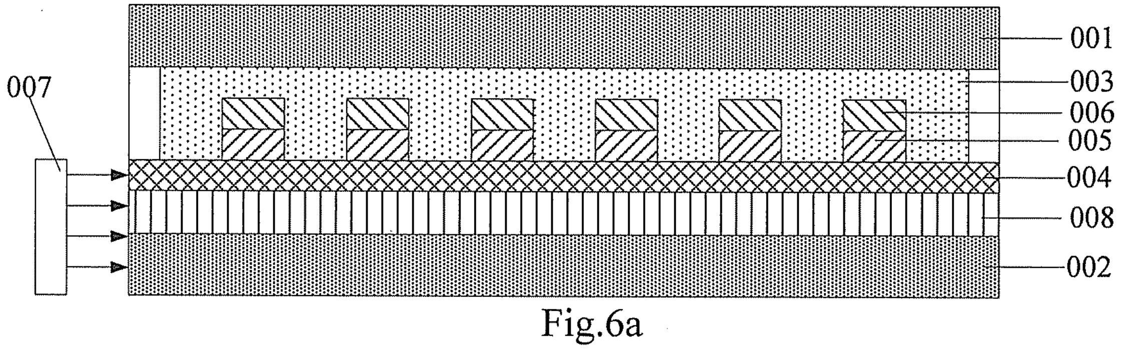
Figure 6B:
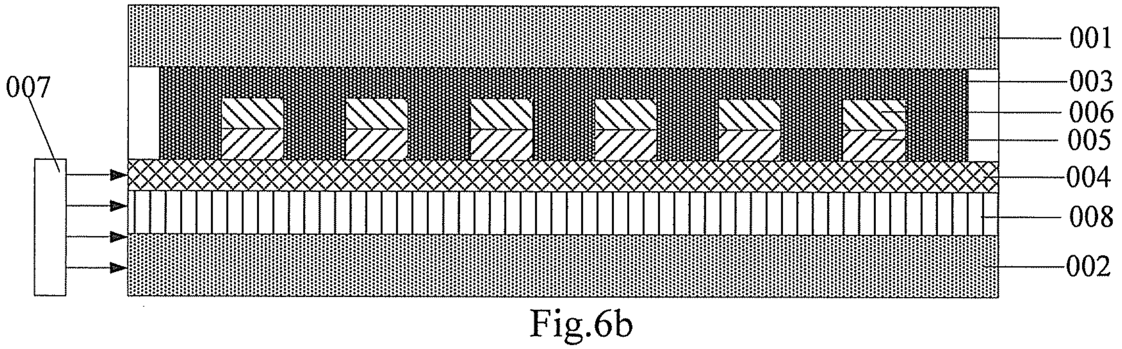

FIG. 6*a* and FIG. 6*b* are respective schematic structural diagrams in a third example.

DETAILED DESCRIPTION OF THE EMBODIMENTS

In order to make the objects, technical solutions, and advantages of the embodiments of the disclosure more apparent, the technical solutions according to the embodiments of the disclosure will be described below clearly and fully with reference to the drawings in the embodiments of the disclosure. Apparently the described embodiments are only a part but not all of the embodiments of the disclosure. Based upon the embodiments of the disclosure here, all of other embodiments which can occur to those ordinarily skilled in the art without any inventive effort shall come into the scope of the disclosure as claimed.

Unless defined otherwise, technical terms or scientific terms throughout the disclosure shall convey their usual meaning as appreciated by those ordinarily skilled in the art to which the disclosure pertains. The term "first", "second", or the like throughout the disclosure does not suggest any order, number or significance, but is only intended to distinguish between different components Alike the term "include", "comprise", or the like refers to that an element or an item preceding to the term encompasses an element or an item succeeding to the term, and its equivalence, but shall not preclude another element or item. The term "connect", "connected", or the like does not suggest physical or mechanical connection, but may include electrical connection no matter whether it is direct or indirect. The term "above", "below", "left", "right", etc., is only intended to represent a relative positional relationship, and when the absolute position of an object as described is changed, the relative positional relationship may also be changed accordingly.

The shapes and sizes of respective components in the drawings will not reflect any real proportion of a display device, but are only intended to illustrate the disclosure by way of an example.

At least one embodiment of the disclosure provides a display device, the display device includes an upper substrate and a lower substrate arranged opposite to each other, a liquid crystal layer, a waveguide layer, a plurality of grating coupling structures, and a plurality of electrode structures. The liquid crystal layer is arranged between the upper substrate and the lower substrate, and liquid crystal molecules in the liquid crystal layer have a refractive index no with respect to o-polarized light, and a refractive index ne with respect to e-polarized light; the waveguide layer is arranged on a side of the lower substrate facing the upper substrate, and a refractive index of the waveguide layer is at least greater than a refractive index of a film layer in contact with the waveguide layer; the plurality of grating coupling structures are arranged and arrayed on a surface of the waveguide layer on a side thereof facing the upper substrate; and the plurality of electrode structures are arranged on sides of the grating coupling structures facing the upper substrate and are in correspondence to the grating coupling structures in a one-to-one manner.

At least one embodiment of the disclosure further provides a display device including the display panel above, and a collimating backlight structure at least arranged on one side of the waveguide layer, where collimated backlight exit from the collimating backlight structure.

In an alternative embodiment, for example, the refractive index no of the liquid crystal molecules in the liquid crystal layer with respect to o-polarized light may be less or greater than the refractive index ne of the liquid crystal molecules with respect to e-polarized light. The embodiments of the disclosure will be described in details by taking no less than ne as an example, although the embodiments of the disclosure will not be limited thereto.

In some embodiments, for example, the collimated backlight exiting from the collimating backlight structure may be incident into the waveguide layer perpendicular to the side of the waveguide layer; and in another example, the collimated backlight exiting from the collimating backlight structure may be incident into the waveguide layer at an inclination angle satisfying a total reflection condition in the waveguide layer. For example, the embodiments of the disclosure will be described in details by taking the perpendicular incident collimated backlight as an example, although the embodiments of the disclosure will not be limited thereto.

In some embodiments, for example, the collimated backlight exiting from the collimating backlight structure may be incident into the waveguide layer only; in another example, the collimated backlight exiting from the collimating backlight structure may be incident into the waveguide layer and a buffer layer, and at least a part of backlight transmitted in the buffer layer may be provided to the waveguide layer via an interface between the waveguide layer and the buffer layer; and in still another example, the collimated backlight exiting from the collimating backlight structure may be incident into the waveguide layer, the buffer layer, and the lower substrate, at least a part of collimated backlight transmitted in the lower substrate may be provided to the buffer layer via an interface between the lower substrate and the buffer layer, and at least a part of the backlight transmitted in the buffer layer may be provided to the waveguide layer via the interface between the waveguide layer and the buffer layer. For example, the embodiments of the disclosure will be described in details by way of an example in which the collimated backlight exiting from the collimating backlight structure may be incident into the waveguide layer, the buffer layer, and the lower substrate, although the embodiments of the disclosure will not be limited thereto.

Figure 1:
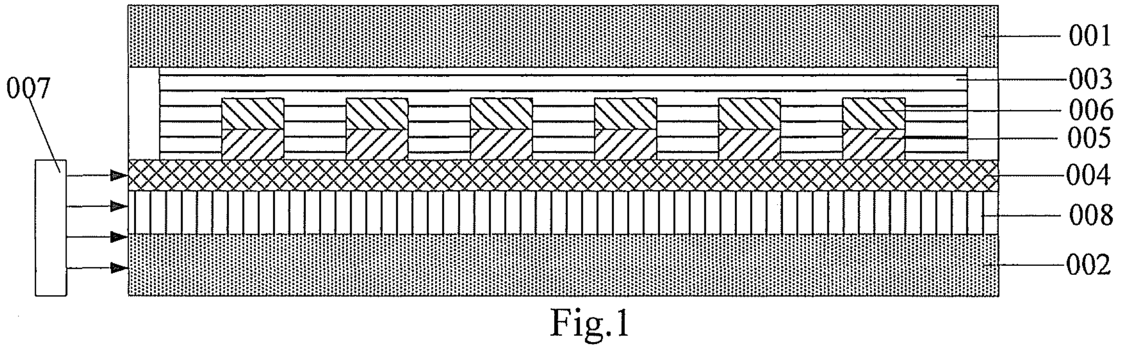
FIG. 1 is a schematic structural diagram of a display device according to an embodiment of the disclosure.

For example, FIG. 1 illustrates a sectional view of a display panel and a display device according to an embodiment of the disclosure, where the display panel can include: an upper substrate 001 and a lower substrate 002 arranged opposite to each other; a liquid crystal layer 003 arranged between the upper substrate 001 and the lower substrate 002; a waveguide layer 004 arranged on a side of the lower substrate 002 facing the upper substrate 001, where a refractive index of the waveguide layer 004 is at least greater than a refractive index of a film layer in contact with the waveguide layer 004; a plurality of grating coupling structures 005 arranged and arrayed on a surface of the waveguide layer 004 on a side thereof facing the upper substrate 001; and electrode structures 006 arranged on sides of the grating coupling structures 005 facing the upper substrate 001 and in correspondence to the grating coupling structures 005 in a one-to-one manner.

In the embodiment illustrated in FIG. 1, for example, the film layer in contact with the waveguide layer 004 includes the grating coupling structures 005 and a buffer layer 008, although the embodiments of the disclosure will not be limited thereto.

For example, refractive indexes of respective grating strips may be n, where n is equal to no, ne, or any value between no and ne, although the embodiments of the disclosure will not be limited thereto; and here no is the refractive index of liquid crystal molecules in the liquid crystal layer 003 with respect to o-polarized light, and ne is the refractive index of the liquid crystal molecules in the liquid crystal layer 003 with respect to e-polarized light. For example, in the case that the refractive indexes of the respective grating strips are n, where n is equal to no, ne, or any value between no and ne, voltage applied to the liquid crystal layer can be adjusted so that the refractive index of the liquid crystal layer 003 as perceived by at least a part of light rays transmitted in the waveguide layer 004 is equal to the refractive indexes of the respective grating strips, thus lowering the intensity of light rays exiting from the display panel in a dark state (e.g., the L0 state) so as to improve the contrast of the display panel.

For example, based upon the same inventive concept, an embodiment of the disclosure further provides a display device including the display panel above according to the embodiments of the disclosure, and as illustrated in FIG. 1, the display device can further include a collimating backlight structure 007 at least arranged on one side of the waveguide layer 004, where collimated light exits from the collimating backlight structure.

In the display panel and the display device above according to the embodiments of the disclosure, for example, a particular mode in the waveguide layer 004 can be coupled by the grating coupling structures 005 to thereby select the direction and the color of emergent light. For example, the refractive indexes of the respective grating strips may be set to n, where n is equal to no, ne, or any value between no and ne, and thereafter voltage applied to the liquid crystal layer 003 can be adjusted by the electrode structures 06 to thereby adjust the refractive index of the liquid crystal layer 003 so as to control a display grayscale. For example, when the refractive index of the liquid crystal layer 003 is equal to the refractive indexes of the respective grating strips, the function of the grating coupling structures 005 are disabled so that no light is coupled out of the waveguide layer 004, which is referred to as the L0 state; when there is the largest difference between the refractive index of the liquid crystal layer 003, and the refractive indexes of the respective grating strips, the grating coupling structures 005 function to the best, so that light rays are coupled out of the waveguide layer 004 with the highest efficiency, which is referred to as the L255 state; and when the refractive index of the liquid crystal layer 003 lies between the two instances above, there is an intermediate display grayscale state.

For example, since the grating coupling structures 005 have a function of selecting the light emitting direction, the display panel and the display device above according to the embodiments of the disclosure can selectively converge light rays for display around human pupils to thereby achieve a near-to-eye display with monocular focus. Furthermore since the grating coupling structures 005 can couple light rays out of the waveguide layer 004 effectively in only several grating periods, where each grating period is typically short in an order of several micrometers or hundreds of nanometers, the size of a pixel may be small, thus facilitating a display with a high Pixels Per Inch (PPI). Moreover since the grating coupling structures 005 have the function of selecting the color of emergent light, color filters may be dispensed, and all the components in the display panel and the display device can be made of a transparent material to thereby implement a transparent display and a virtual/augmented reality display with high transparency.

Figure 2:
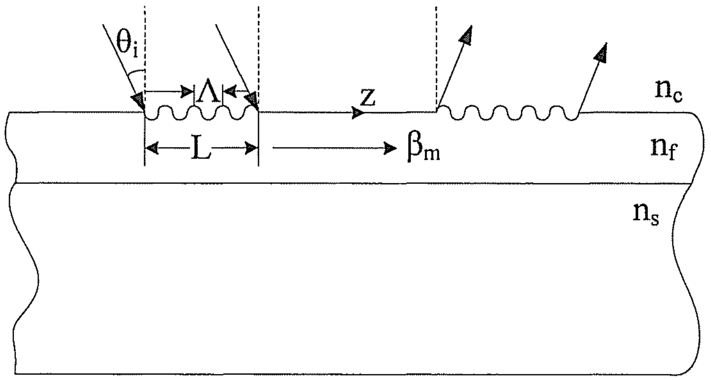
FIG. 2 is a schematic principle diagram of optical waveguide coupling in the prior art.

In optical communication and integrated optics, an optical waveguide is a common basic component. In order to couple a light beam into or out of the optical waveguide effectively, a grating coupler is commonly used. As illustrated in FIG. 2, when an incident light beam or an emergent light beam satisfies a phase matching relationship defined in an equation of $\beta_q=\beta_m-qK(q=0, \pm1, \pm2, \ldots)$, an incident light can excite the m-th order of guided mode in the optical waveguide, or the m-th order of guided mode can be coupled out in a given direction. In the equation above, $\beta_m$ is a propagation constant $\beta_m=k_0N_m$ in the m-th order of guided mode, $N_m$ is a valid refractive index in the m-th order of guided mode, K is a grating vector, $K=2\pi/\Lambda$, and $\Lambda$ is a grating period.

If an included angle between a wave vector direction of the incident light (or the emergent light), and a vertical direction is $\theta_i$, then the phase matching relationship above may be further represented as $k_0n_c \sin\theta_i=k_0N_m-q2\pi/\Lambda$ $(q=0, \pm1, \pm2, \ldots)$.

If a substrate of the optical waveguide is a transparent medium, then input-output coupling may be further made on a side of the substrate, and at this time, the phase matching relationship above may be represented as $k_0n_s \sin\theta=k_0N_m-q2\pi/\Lambda$ $(q=0, \pm1, \pm2, \ldots)$.

Based on this, for example, in the display panel and the display device above according to the embodiments of the disclosure, the function of the plurality of grating coupling structures 0005 arranged and arrayed on the surface of the waveguide layer 004 on the side thereof facing the upper substrate 001 is: selecting light rays in a given color (at a light wavelength λ) from light rays propagated in the waveguide layer 004 to exit in a given direction (at an included angle θ from a normal of a surface of the waveguide layer 004). Accordingly a grating coupling structure 005 corresponds to a sub-pixel structure in the display device.

For example, the light wavelength λ, with a controllable light direction, coupled out of the waveguide layer 004 by the grating coupling structures 005 in the display panel and the display device above according to the embodiments of the disclosure, and the grating period A of the grating coupling structures 005 satisfy an equation of: $2\pi/\lambda\cdot N_m=2\pi/\lambda\cdot n_c \sin\theta+q2\pi/\Lambda$ $(q=0, \pm1, \pm2, \ldots)$.

Where θ is an included angle between a direction of a coupled light, and the normal of the surface of the waveguide layer 004; $N_m$ is a valid refractive index of a propagation guided mode in the waveguide layer 004; and $n_c$ is a refractive index of the liquid crystal layer 003.

Figure 3:
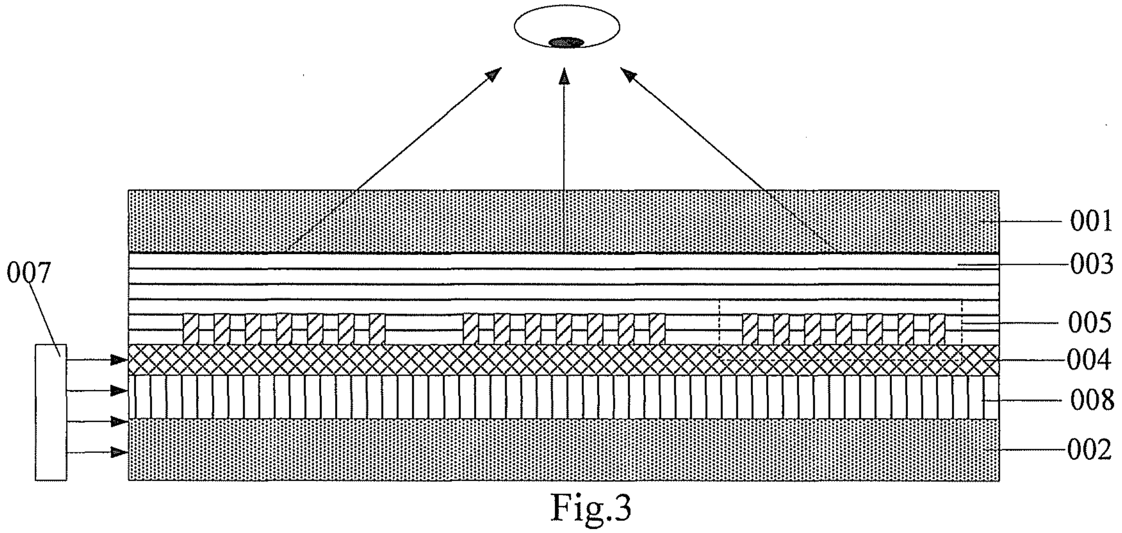
FIG. 3 is a schematic diagram of controlling a light emitting direction of a display device according to an embodiment of the disclosure.

For example, a direction of light exiting from a pixel at some position in the display panel and the display device above according to the embodiments of the disclosure tends to be fixed, and determined by a position of the pixel relative to human eyes as illustrated in FIG. 3, that is, the angle θ is fixed. Accordingly grating periods Λ of the respective grating coupling structures 005 can be adjusted to thereby select light rays in a given color (at the light wavelength λ) to exit in a given direction (at the included angle θ from the normal of the surface of the waveguide layer 004).

For example, each of the grating coupling structures 005 in the display panel and the display device above according to the embodiments of the disclosure includes a plurality of grating strips arranged at an interval, and slits arranged between two adjacent ones of the grating strips. Furthermore the material of respective grating strips is a transparent medium material, e.g., $SiO_2$, a resin material, etc. And in order to enable light rays at a set wavelength to exit from the waveguide layer 004, refractive indexes of the respective grating strips in a grating coupling structure 005 are n, where n is equal to no, ne, or any value between no and ne. For example, in the case that no is less than ne, the value of n is preferably no; and in the case that no is greater than ne, the value of n is preferably ne. In each grating coupling structure 005, a sum of a width of a grating strip and a width of a slit adjacent thereto is a grating period Λ of the each grating coupling structure 005; and as described above, the grating period Λ is determined by a required direction and color of emergent light. For example, a duty ratio in each grating coupling structure 005 may be 0.5 (a ratio of the width of each grating strip to the grating period Λ), but in a practical product design, the duty ratio may deviate from this value due according to considerations such as a required intensity of emergent light, a difference in brightness between different positions of a display panel that needs to be balanced, a process condition, and other factors.

For example, a thickness of each grating coupling structure 005 in the display panel and the display device above according to the embodiments of the disclosure (i.e., the thickness of each grating coupling structure 005 in the direction perpendicular to the upper substrate) may be set between 100 nm to 1 μm. Furthermore the thicknesses of respective grating coupling structures 005 corresponding to sub-pixels in different colors (RGB) may or may not be the same. For example, the thickness of each grating coupling structure 005 may be approximately 300 nm uniformly, although the embodiments of the disclosure will not be limited thereto. For example, the thickness of each grating coupling structure 005 may alternatively be 200 nm, 400 nm, 600 nm, or 800 nm.

For example, each display pixel of the display panel can correspond to one grating coupling structure and one electrode structure, both of which can control the intensity of light rays coupled out of the waveguide layer 004 in combination with liquid crystal molecules in the display pixel to thereby control a grayscale of the display pixel, although the number of the grating coupling structure(s) and the number of the electrode structure(s) in each display pixel may not be limited thereto. For example, there may be three grating coupling structures and three electrode structures in each display pixel.

For example, in the display panel and the display device above according to the embodiments of the disclosure, the electrode structures 006 configured to control the liquid crystal molecules of the respective sub-pixels to thereby control their grayscales are arranged above the grating coupling structures 005. Based on this, in order to facilitate a design of the electrode structures, for example, each electrode structure 006 can include a plurality of electrode strips arranged on respective grating strips of a corresponding grating coupling structure 005; that is, an electrode stripe is arranged on each grating strip, so that the grating coupling structures 005 and the electrode structures 006 constitute a stacked compound structure; and a width of each electrode strip is not greater than a width of each grating strip, and for example, the width of each electrode strip may be equal to the width of each grating strip.

For example, the number of grating strips in each grating coupling structure 005 can be set as needed in a practical application, although the embodiments of the disclosure will not be particularly limited thereto. For example, there may be 2 to 8 grating strips (e.g., 6 grating strips) in each grating coupling structure 005.

For example, in order to enable the electrode strips in each electrode structure 006 to generate an electric field for controlling liquid crystal to rotate, in the display device above according to the embodiments of the disclosure, the electrode strips in the respective electrode structures can include an electrode strip configured to load a positive electric signal, and an electrode strip configured to load a negative electric signal, and the electrode strip configured to load a positive electric signal and the electrode strip configured to load a negative electric signal are arranged alternately; that is, the positive and negative electrodes are arranged alternatively. For example, spacing between two adjacent electrode strips (spacing in a direction perpendicular to an extension direction of the electrode strips, and parallel to the upper substrate) may be less than spacing between the electrode strips and the upper substrate in a direction perpendicular to the upper substrate. In this way, as compared with the electrode structures in which the upper and lower electrodes are arranged, in the embodiments of the disclosure, there is a smaller spacing between the electrodes by arranging positive and negative electrodes alternately in the same plane, and thus there is a stronger electric field between the electrodes, and there is a higher capability to control the liquid crystal molecules, so that a higher response speed and lower drive voltage can be achieved.

For example, since the grating coupling structures 005 are arranged between the electrode structures 006 and the waveguide layer 004, and the refractive index of the material of the grating coupling structures 005 matches better than that of the material of the electrode structures 006 with the refractive index of the liquid crystal material, the stacked structure of the gratings and the electrodes can further alleviate the problem of light leakage in the black state arising from the mismatch in refractive indexes between the electrode material and the liquid crystal material effectively.

For example, the structural design above can enable the electrode structures 006 and the grating coupling structures 005 to be fabricated in the same patterning process, so in order to fabricate this structure through etching, for example, the sum of the thicknesses of each grating coupling structure 005 and each electrode structure 006 (i.e., the thickness of each electrode structure 006 in the direction perpendicular to the upper substrate) is not greater than the width of each grating strip (i.e., the width of each grating strip in the direction perpendicular to the extension direction thereof, and parallel to the upper substrate, that is, the direction parallel to the surface of the paper, and parallel to the upper substrate in FIG. 1), although the embodiments of the disclosure will not be limited thereto.

In the display panel and the display device above according to the embodiments of the disclosure, for example, each electrode structure 006 may be made of a transparent conductive material, e.g., ITO, etc., and at this time, the thickness of each electrode structure 006 may be controlled between 50 nm to 1000 nm, and may be approximately 100 nm. Alternatively each electrode structure 006 may be made of a thinner metal material, e.g., Au, an Ag—Mg alloy, etc., and at this time, the thickness of each electrode structure 006 may be controlled between 30 nm and 200 nm. Since the metal material is thinner, there is also a good transmittance of each electrode structure 006.

For example, the upper substrate 001 and the lower substrate 002 in the display panel and the display device above according to the embodiments of the disclosure can be selected as needed in a practical application, although the embodiments of the disclosure will not be limited thereto. For example, the upper substrate 001 and the lower substrate 002 may be base substrates of a common Liquid Crystal Display (LCD) panel or Organic Light emitting Diode (OLED) panel, or may be made of some special optical glass, resin material, etc. For example, the thickness of the upper substrate 001 and the thickness of the lower substrate 002 may be set between 0.1 mm and 2 mm respectively, and their parameters may be determined according to a particular product design or process condition, and for example, there may be good flatness and parallelism of the upper and lower surfaces of the upper substrate 001 and the lower substrate 002.

In the display panel and the display device above according to the embodiments of the disclosure, for example, in order to enable the waveguide layer 004 to guide as many light rays as possible into the liquid crystal layer 003, for example, the refractive index of the waveguide layer 004 not only needs to be greater than the refractive index of the film layer in contact with the waveguide layer 004, but may preferably also needs to be greater than refractive indexes of other respective layer structures, that is, the refractive index of the waveguide layer 004 is the highest in the display device. For example, in some structural design, the refractive index of the waveguide layer 004 needs to be as high as possible, and generally the waveguide layer 004 is required to be transparent, although the embodiments of the disclosure will not be limited thereto. For example, the waveguide layer 004 may be made of $Si_3N_4$ or the like, although the embodiments of the disclosure will not be limited thereto.

In the display device according to the embodiments of the disclosure, for example, the thickness of the waveguide layer 004 (i.e., the thickness of the waveguide layer 004 in the direction perpendicular to the upper substrate) may be set between 100 nm and 100 μm, and when the collimating backlight structure 007 has a good collimating characteristic, or can control the mode coupled into the waveguide layer 004 effectively, the thickness of the waveguide layer 004 may be increased as appropriate to thereby improve the incident efficiency of light, for example, the thickness of the waveguide layer 004 may range from 500 nm to 100 μm (e.g., 700 nm or 10 μm); and when the collimating backlight structure 007 has a poor collimating characteristic, in order to enable the grating coupling structures 005 to control the direction and the color of emergent light conveniently, the thickness of the waveguide layer 004 needs to be small enough, and the waveguide layer 004 is preferably a unimode optical waveguide. For example, the thickness of the waveguide layer 004 is 100 nm or 200 nm, although the embodiments of the disclosure will not be limited thereto.

In order to improve the uniformity of the film growth of the waveguide layer 004, the display panel and the display device above according to the embodiments of the disclosure, for example, can further include a buffer layer 008 arranged between the waveguide layer 004 and the lower substrate 002, as illustrated in FIG. 1. For example, firstly the buffer layer 008 can be fabricated on the lower substrate 002, and then the waveguide layer 004 can be grown on the buffer layer 008, thus facilitating a high quality of the thin film of the waveguide layer 004.

In the display panel and the display device above according to the embodiments of the disclosure, for example, a thickness of the buffer layer 008 may range from 50 nm to 10 μm. For example, a material of the buffer layer 008 may be a transparent medium material, e.g., $SiO_2$, a resin material, etc.

For example, the buffer layer 008 can be in direct contact with the waveguide layer 004, and a refractive index of the buffer layer 008 may be less than the refractive index of the waveguide layer 004. At this time, the collimated backlight exiting from the collimating backlight structure can be incident into both the waveguide layer and the buffer layer, and at least a part of backlight transmitted in the buffer layer can be provided to the waveguide layer via an interface between the waveguide layer and the buffer layer. In this way, the intensity of the collimated backlight exiting from the collimating backlight structure after being incident into the waveguide layer 004 can be improved, and a quality required of light beams of the collimated backlight may be lowered, so that the efficiency of the display panel and the display device according to the embodiments of the disclosure can be improved.

For example, the buffer layer 008 can be in contact with the lower substrate 002, and the refractive index of the buffer layer 008 can be greater than the refractive index of the lower substrate 002. At this time, the collimated backlight exiting from the collimating backlight structure can be incident into the waveguide layer, the buffer layer, and the lower substrate, at least a part of the collimated backlight transmitted in the lower substrate can be provided to the buffer layer via an interface between the lower substrate and the buffer layer, and at least a part of the backlight transmitted in the buffer layer can be provided to the waveguide layer via the interface between the waveguide layer and the buffer layer. In this way, the intensity of the collimated backlight exiting from the collimating backlight structure after being incident into the waveguide layer 004 can be further improved, and a quality required of light beams of the collimated backlight may be further lowered, so that the efficiency of the display panel and the display device according to the embodiments of the disclosure can be further improved.

In the display panel and the display device above according to the embodiments of the disclosure, for example, the type of the collimated backlight can be selected as needed in a practical application, although the embodiments of the disclosure will not be limited thereto. For example, in the case that the display device is a monochromatic display device, the collimated backlight can be monochromatic light. In another example, in the case that the display device is a color display device, the collimated backlight can be polychromatic light, where the polychromatic light (i.e. mixed light) can be obtained by mixing a plurality of monochromatic light, can be obtained from a light source that exits polychromatic light (e.g., a cold cathode fluorescence tube or a white light LED).

For example, the collimated backlight can be light into which monochromatic light emitted from at least three types of monochromatic laser devices is mixed, and for example, light emitted from semiconductor laser devices (e.g., laser diodes) in three colors of red (R), green (G), and blue (B) is mixed into the collimated backlight. Alternatively the collimated backlight can be light into which monochromatic light emitted from at least three types of monochromatic light emitting diodes is mixed by the collimating structure, and for example, light emitted from light emitting diodes in three colors of R, G and B is collimated and mixed into the collimated backlight. Alternatively the collimated backlight can be white light, emitted by a white light emitting diode, which is collimated by the collimating structure, and for example, white light is emitted by the white light emitting diode, and collimated by the collimating structure into the collimated backlight. Alternatively the collimated backlight can be collimated light into which light rays emitted by a strip-shaped Cold Cathode Fluorescent Lamp (CCFL) are collimated by the collimating structure. The collimated backlight will not be limited to the types above.

For example, the collimating backlight structure can be a linear light source, which can extend in the same extension direction as the side of the waveguide layer 004 (for example, both of them can extend in the direction perpendicular to the surface of the paper), so that the extent to which the collimated backlight exiting from the collimating backlight structure matches with the waveguide layer 004 can be improved to thereby improve the efficiency of coupling the collimated backlight by the waveguide layer 004. For example, a size of the collimated backlight in the direction perpendicular to the upper substrate can be selected as needed in a practical application, although the embodiments of the disclosure will not be limited thereto.

For example, a width of the collimated backlight in the direction perpendicular to the surface of the paper in the drawings can be selected as needed in a practical application, although the embodiments of the disclosure will not be limited thereto. For example, in order to enable in effect the collimated backlight to be incident from the side of the waveguide layer 004 into the waveguide layer 004, and to be propagated therein, in the display device above according to the embodiments of the disclosure, the width of the collimated backlight can match with the width of the side of the waveguide layer 004 (e.g., the width of the waveguide layer 004 in the direction perpendicular to the surface of the paper in the drawings). And for example, the collimating backlight structure can be embodied as an array of laser devices, or an array of light emitting diodes, with the same width as that of the waveguide layer 004, or the collimating backlight structure can be embodied as a structure including both an array of Laser Devices (LDs), or an array of Light emitting Diodes (LEDs), and a beam expanding structure arranged on the light emitting side of the array of LDs or LEDs.

For example, in order to enable in effect the collimated light to be propagated in the waveguide layer 004, the collimated backlight in the display device above according to the embodiments of the disclosure is generally arranged to be incident into the waveguide layer 004 perpendicular to the side of the waveguide layer 004 (for example, the incident collimated backlight can be parallel to the upper substrate and the lower substrate; or in another example, the incident collimated backlight can be parallel to both the upper and lower substrates, and the surface of the paper in FIG. 1). For example, the collimated backlight can be incident into the waveguide layer 004 in a way align with the waveguide layer 004 as much as possible. In another example, when there is a large thickness of the waveguide layer 004, the collimated backlight can alternatively be incident into the waveguide layer 004 at an inclination angle satisfying the total reflection condition in the waveguide layer 004, that is, the collimated backlight is incident into the waveguide layer 004 at a set inclination angle to thereby improve the intensity of light rays coupled out of the waveguide layer 004, and the extraction efficiency of the display panel and the display device.

In the display panel and the display device above according to the embodiments of the disclosure, for example, the liquid crystal layer 003 can overlie the electrode structures 006, and be filled into slits between the grating coupling structures 005, and a thickness of the liquid crystal layer 003 can range from hundreds of nanometers to several micrometers. For example, the thickness of the liquid crystal layer 003 can be set to approximately 1 μm.

In the display panel and the display panel above according to the embodiments of the disclosure, for example, a material of the liquid crystal layer 003 can be selected according to a required display mode, and an implementation of grayscales.

The achievable display modes of the display device above according to the embodiments of the disclosure will be described below in details in connection with several examples thereof. It shall be noted that initial orientations of liquid crystal molecules refers to an extension direction of major axes of the liquid crystal molecules to which no voltage is applied via the electrode structures in the following examples.

A first example relates to a display mode in which optical axes of the liquid crystal molecules rotate in a plane perpendicular to the display panel.

Figure 4A:
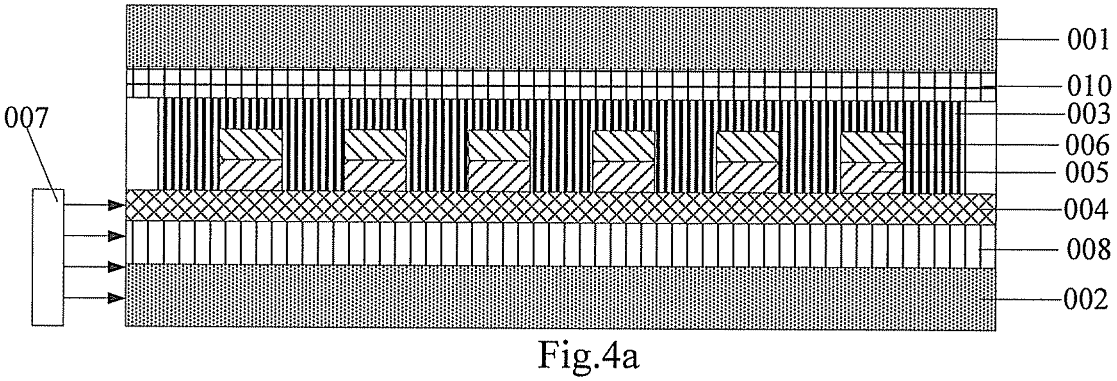
FIG. 4*a* and FIG. 4*b* are respective schematic structural diagrams in a first example.

In this display mode, as illustrated in FIG. 4*a*, the display device above according to the embodiments of the disclosure further includes an alignment layer 010 (which may be a PI with a thickness of 30 nm to 80 nm) arranged on a surface of the upper substrate 001 on a side thereof facing the liquid crystal layer 003, and/or on surfaces of the electrode structures 006 on sides thereof facing the liquid crystal layer 003. FIG. 4*a* illustrates the alignment layer 010 arranged only on the surface of the upper substrate 001 on the side thereof facing the liquid crystal layer 003. The initial orientations of the liquid crystal molecules in the liquid crystal layer 003 can be controlled through the arranged alignment layer 010, so that the initial orientations of the liquid crystal molecules in the liquid crystal layer 003 are perpendicular to the upper substrate 001 and the lower substrate 002, and at this time, there is a largest difference between the refractive index of the liquid crystal layer 003 (the refractive index of the liquid crystal layer 003 as perceived by e-polarized light in the waveguide layer 004), and the refractive indexes of the grating strips, so the grating coupling structures 005 function to the best so that light rays are coupled out of the waveguide layer 004 with the highest efficiency, which is referred to the L255 grayscale.

Figure 4B:
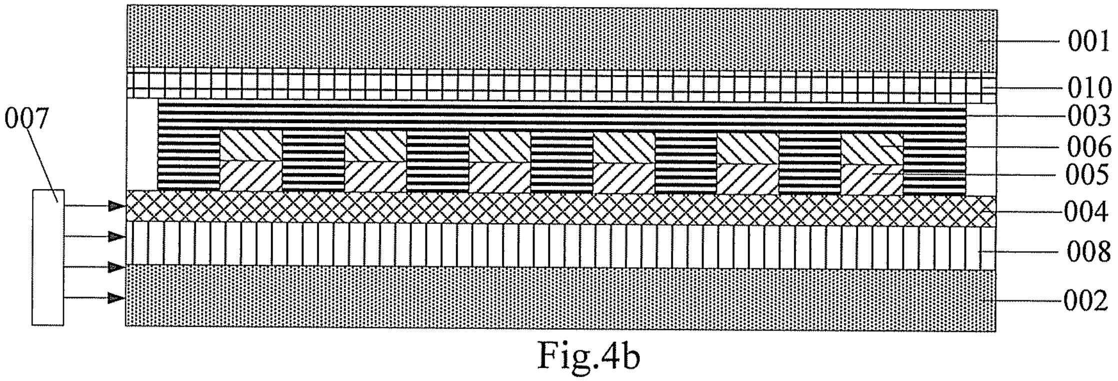

For example, an electric field acting on the liquid crystal layer 003 due to the voltage applied by the respective electrode structures 006 can be adjusted so that the liquid crystal molecules rotate in the plane perpendicular to the display panel (i.e., the plane where the surface of the paper in FIG. 1 lies) to thereby adjust the refractive index of the liquid crystal layer 003 between no and ne for different grayscales. As illustrated in FIG. 4*b*, when the orientations of the liquid crystal molecules are parallel to the upper substrate 001, the refractive index of the liquid crystal layer 003 (the refractive index of the liquid crystal layer 003 as perceived by e-polarized light in the waveguide layer 004) is equal to the refractive indexes of the grating strips, so the function of the grating coupling structures 005 are disabled, thus no light is coupled out of the waveguide layer 004, which is referred to as the L0 grayscale.

Since the refractive index variations of the liquid crystal layer 003 are perceivable only for polarized light with a polarization direction parallel to the lower substrate, and perpendicular to a length direction of the grating coupling structures 005 (e-polarized light), but not for polarized light with a polarization direction parallel to the lower substrate and the length direction of the grating coupling structures 005 (o-polarized light), the e-polarized light can be displayed in this display mode.

For example, take the refractive indexes of the grating strips are no as an example, when the refractive index of the liquid crystal layer 003 is equal to the refractive indexes of the grating strips, that is, both of them are no, the function of the grating coupling structures 005 are disabled so that no light is coupled out of the waveguide layer 004, and at this time, the grayscale is the lowest, which is referred to as the L0 state; when there is the largest difference between the refractive index (ne) of the liquid crystal layer 003, and the refractive indexes (no) of the grating strips, the grating coupling structures 005 function to the best so that light rays are coupled out of the waveguide layer 004 with the highest efficiency, and at this time, the grayscale is the highest, which is referred to the L255 state; and when the refractive index of the liquid crystal layer 003 lies between the two instances above, there is another grayscale state.

For example, the refractive index variations above are perceivable only when the polarization direction of the light coupled out of the grating coupling structures 005 is parallel to the lower substrate, and perpendicular to the length direction of the grating coupling structures 005, but not perceivable for light with other polarization directions, so no polarizer will be arranged.

Furthermore for nematic phase liquid crystal, generally an alignment layer needs to be added to the upper surface of the liquid crystal layer 003, or alignment layers need to be added to both the upper and lower surfaces of the liquid crystal layer 003, to thereby control the initial orientation of the liquid crystal layer 003 so that the liquid crystal molecules can rotate as described above under the control of the voltage being applied. And for example, no alignment layer needs to be arranged for some liquid crystal material.

For example, in this example, since the initial orientations of the liquid crystal molecules in the liquid crystal layer 003 are perpendicular to the upper substrate 001 and the lower substrate 002, the display mode of the display panel in this example is a normally white display mode. In another example, in the case that the initial orientations of the liquid crystal molecules are parallel to both the upper substrate 001, and the surface of the paper in the drawings due to the alignment layer(s), the display mode of the display panel is a normally black display mode. Accordingly the alignment layer(s) can be arranged as needed in a practical application, although the embodiments of the disclosure will not be limited thereto.

For example, the refractive indexes of the grating strips are equal or approximate to no throughout the foregoing description, and at this time, the display device can display normally without requiring any polarizer to be added to the light emitting side, or requiring an edge incident collimated light source to be polarized light.

For example, when the refractive indexes of the grating strips are equal to ne, or between no and ne, a polarizer needs to be added to the light emitting side of the display device, that is, the polarizer is arranged on a surface of the upper substrate 001 on a side thereof facing away from the liquid crystal layer 003; or the collimated backlight incident into the waveguide layer needs to be polarized light to thereby eliminate interference of polarized light exiting independent of orientation deflection of the liquid crystal. For example, a polarizing element (e.g., a polarizer) can be arranged at the light emitting side of the collimating backlight structure, so that the collimated backlight is collimated polarized light.

For example, the liquid crystal is generally required to be positive liquid crystal in this display mode.

A second example relates to a display mode in which the optical axes of the liquid crystal molecules rotate in a plane parallel to the display panel.

Figure 5A:
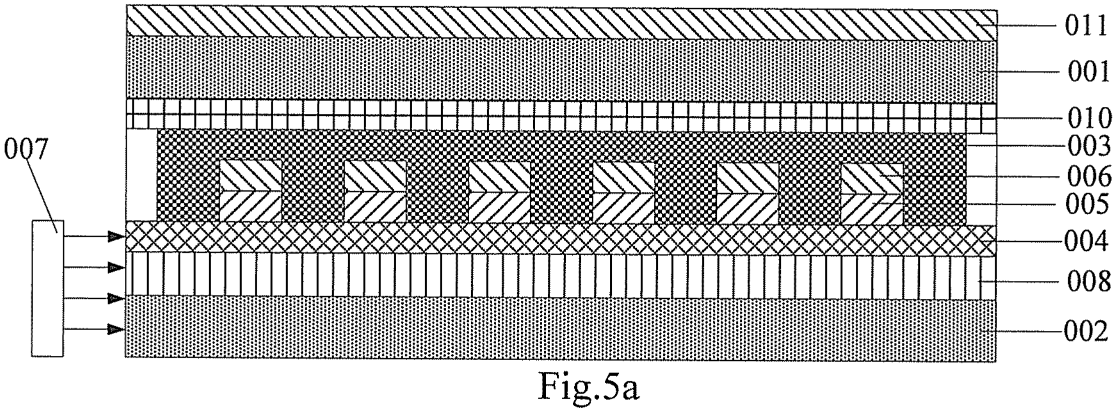
FIG. 5*a* and FIG. 5*b* are respective schematic structural diagrams in a second example.

In this display mode, as illustrated in FIG. 5*a*, the display device above according to the embodiments of the disclosure further includes an alignment layer 010 (which may be a PI with a thickness of 30 nm to 80 nm) arranged on the surface of the upper substrate 001 on the side thereof facing the liquid crystal layer 003, and/or on the surfaces of the electrode structures 006 on the sides thereof facing the liquid crystal layer 003, where FIG. 5*a* illustrates the alignment layer 010 arranged only on the surface of the upper substrate 001 on the side thereof facing the liquid crystal layer 003; and a polarizer 011 arranged on the surface of the upper substrate 001 on the side thereof facing away from the liquid crystal layer 003, or the collimated backlight is collimated polarized light. The initial orientations of the liquid crystal molecules in the liquid crystal layer 003 can be controlled through the arranged alignment layer 010, so that the initial orientations of the liquid crystal molecules in the liquid crystal layer 003 are parallel to the upper substrate 001 and the lower substrate 002; and for example, when the initial orientations of the liquid crystal molecules are parallel to the upper substrate 001, and perpendicular to the surface of the paper; and polarized light with a polarization direction perpendicular to the surface of the paper is transmitted through the polarizer, or the incident light is polarized light with a polarization direction perpendicular to the surface of the paper, there is the L255 grayscale in this case.

Figure 5B:
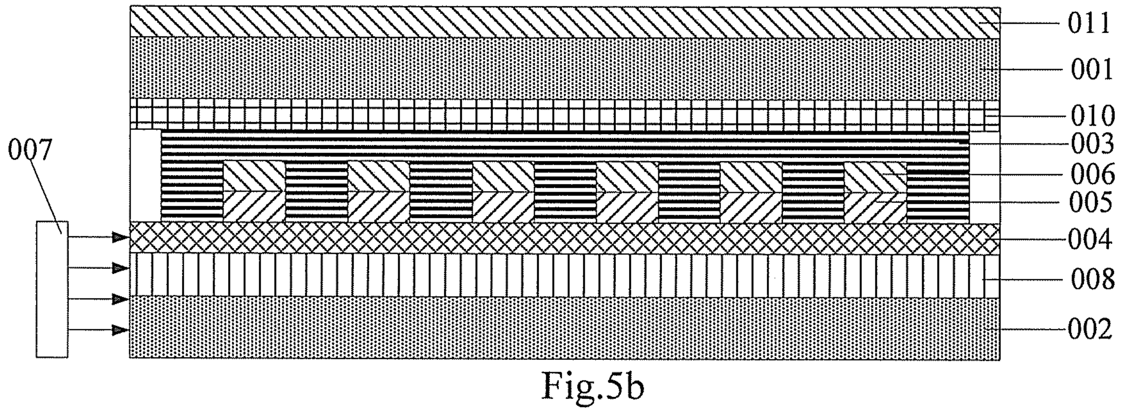

For example, the electric field acting on the liquid crystal layer 003 due to the voltage applied by the respective electrode structures 006 can be adjusted so that the liquid crystal molecules rotate in the plane parallel to the display panel to thereby adjust the refractive index of the liquid crystal layer 003 between no and ne for different grayscales. As illustrated in FIG. 5*b*, when the orientations of the liquid crystal molecules are parallel to both the upper substrate 001, and the surface of the paper in the drawings, the refractive index of the liquid crystal layer 003 is equal to the refractive indexes of the grating strips, so the grating coupling structures 005 are disabled in function so that no light is coupled out of the waveguide layer 004, which is referred to as the L0 grayscale.

For example, take the refractive indexes of the grating strips are no as an example, as illustrated in FIG. 5*b*, when the refractive index of the liquid crystal layer 003 is equal to the refractive indexes of the grating strips, that is, both of them are no, the grating coupling structures 005 are disabled in function so that no light is coupled out of the waveguide layer 004, and at this time, the grayscale is the lowest, which is referred to as the L0 state; as illustrated in FIG. 5*a*, when there is the largest difference between the refractive index (ne) of the liquid crystal layer 003, and the refractive indexes (no) of the grating strips, the grating coupling structures 005 function to the best so that light rays are coupled out of the waveguide layer 004 with the highest efficiency, and at this time, the grayscale is the highest, which is referred to the L255 state; and when the refractive index of the liquid crystal layer 003 lies between the two instances above, there is another grayscale state.

Since the refractive index variations above are perceivable for both light with a polarization direction in a first direction, and light with a polarization direction in a second direction, where the first direction is a polarization direction parallel to the lower substrate 002, and perpendicular to the length direction of the grating strips, and the second direction is a polarization direction parallel to both the lower substrate 002, and the length direction of the grating strips, a layer of polarizer needs to be added to the upper substrate 001, or an edge incident light source to thereby select one of the polarized light (in the first direction or the second direction).

Furthermore for nematic liquid crystal, an alignment layer needs to be added to the upper surface of the liquid crystal layer 003, or alignment layers need to be added to both the upper and lower surfaces of the liquid crystal layer 003, to thereby control the initial orientation of the liquid crystal layer 003 so that the liquid crystal molecules can rotate as described above under the control of the voltage being applied. And furthermore a relative relationship between the initial orientations of the liquid crystal molecules, and a polarization analyzing direction of the polarizer can be controlled to thereby determine the normally white mode (in which the initial orientations of the liquid crystal molecules are consistent with the polarization analyzing direction of the polarizer) or the normally black mode (in which the initial orientations of the liquid crystal molecules are perpendicular to the polarization analyzing direction of the polarizer). No alignment layer needs to be arranged for some liquid crystal material. The liquid crystal molecules may be either positive liquid crystal or negative liquid crystal in this display mode.

In this example, for example, since the initial orientations of the liquid crystal molecules in the liquid crystal layer 003 are parallel to the upper substrate 001, and perpendicular to the surface of the paper, the display mode of the display panel in this example is the normally white display mode, although the embodiments of the disclosure will not be limited thereto. In another example, in the case that the initial orientations of the liquid crystal molecules are parallel to both the upper substrate 001, and the surface of the paper in the drawings due to the alignment layer(s), the display mode of the display panel is the normally black display mode. Accordingly the alignment layer(s) can be arranged as needed in a practical application, although the embodiments of the disclosure will not be limited thereto.

A third example relates to a display mode in which blue phase liquid crystal is applied.

In this display mode, as illustrated in FIG. 6*a*, the liquid crystal molecules in the liquid crystal layer 003 in the display device above according to the embodiments of the disclosure are made of a blue phase liquid crystal material for which no alignment film is arranged. When no voltage is applied to the respective electrode structures 600, the liquid crystal molecules are in an isotropic state as illustrated in FIG. 6*a*; and when voltage is applied, they are in an anisotropic state as illustrated in FIG. 6*b*, and this anisotropic state is perceivable for both of the two types of polarized light, so there is a higher extraction efficiency than the several embodiments above.

For example, since the blue phase liquid crystal is isotropic when no voltage is applied thereto, there is the same refractive index in the respective directions, so that both of the refractive indexes of the two types of polarized light passing through the liquid crystal are n; and since the blue phase liquid crystal is anisotropic when voltage is applied thereto, the refractive index of the ordinary light (o-light) is $n_o$, and the refractive index of the unordinary light (e-light) is $n_o$, where $n_o<n<n_e$.

In view of this, the isotropic state can be set to the L0 state (the refractive indexes of the grating strips are n), and the anisotropic state can be set to the L255 state; and at this time, both of the two types of polarized light can be coupled out, so there is a higher extraction efficiency; or the anisotropic state can be set to the L0 state (the refractive indexes of the grating strips are no or ne), and the isotropic state can be set to the L255 state; and at this time, the incident light needs to be polarized light, that is, the collimated backlight is collimated polarized light, or a polarizer may be arranged at the light emitting side, that is, the polarizer is arranged on the surface of the upper substrate 001 on the side thereof facing away from the liquid crystal layer 003.

For example, the display device above according to the embodiments of the disclosure can be a virtual reality/augmented reality display device, a near-to-eye display device, a mobile phone, a tablet computer, a TV set, a monitor, a notebook computer, a digital photo frame, a navigator, or any product or component with a display function.

In the display panel and the display device above according to the embodiments of the disclosure, a particular mode in the waveguide layer can be coupled by the grating coupling structures to thereby select the direction and the color of emergent light; and the refractive indexes of the grating strips may be set to n, where n is equal to no, ne, or any value between no and ne, and thereafter the voltage applied to the liquid crystal layer can be adjusted by the electrode structures to thereby adjust the refractive index of the liquid crystal layer so as to control a display grayscale. For example, when the refractive index of the liquid crystal layer is equal to the refractive indexes of the respective grating strips, the grating coupling structures are disabled in function so that no light is coupled out of the waveguide layer, which is referred to as the L0 state; when there is the largest difference between the refractive index of the liquid crystal layer, and the refractive indexes of the respective grating strips, the grating coupling structures function to the best so that light rays are coupled out of the waveguide layer with the highest efficiency, which is referred to as the L255 state; and when the refractive index of the liquid crystal layer lies between the two instances above, there is an intermediate display grayscale state. Since the grating coupling structures have a function of selecting the light emitting direction, the display device above according to the embodiments of the disclosure can selectively converge light rays for display around human pupils to thereby achieve a near-to-eye display with monocular focus. Furthermore since the grating coupling structures can couple in effect light rays out of the waveguide layer in only several grating periods, where the grating period is typically short in an order of several micrometers or hundreds of nanometers, the size of a pixel may be small, thus facilitating a display with a high Pixels Per Inch (PPI). Furthermore since the grating coupling structures have the function of selecting the color of emergent light, color filters may be dispensed, and all the components in the display device can be made of a transparent material to thereby implement a transparent display and a virtual/augmented reality display with high transparency.

The foregoing description is merely illustrative of the exemplary embodiments of the disclosure, but not intended to limit the scope of the disclosure as claimed thereto. The scope of the disclosure as claimed shall be as defined in the appended claims.

This application claims the benefit of Chinese Patent Application No. 201610924491.8, filed Oct. 24, 2016, which is hereby incorporated by reference in its entirety.

The invention claimed is:

1. A display panel, comprising:

an upper substrate and a lower substrate arranged opposite to each other;

a liquid crystal layer arranged between the upper substrate and the lower substrate, wherein liquid crystal molecules in the liquid crystal layer have a refractive index no with respect to o-polarized light, and a refractive index ne with respect to e-polarized light;

a waveguide layer arranged on a side of the lower substrate facing the upper substrate, wherein a refractive index of the waveguide layer is at least greater than a refractive index of a film layer in contact with the waveguide layer;

a plurality of grating coupling structures arranged and arrayed on a surface of the waveguide layer on a side thereof facing the upper substrate; and a plurality of electrode structures arranged directly on sides of the grating coupling structures facing the upper substrate and are in correspondence to the grating coupling structures in a one-to-one manner;

wherein each of the grating coupling structures comprises a plurality of grating strips arranged at an interval, and slits arranged between two adjacent ones of the grating strips; and each of the electrode structures comprises a plurality of electrode strips, wherein the electrode strips of the each of the electrode structures correspond to grating strips of a corresponding grating coupling structure in a one-to-one manner, and a width of each electrode strip is not greater than a width of each grating strip.

2. The display panel according to claim 1, wherein: the refractive indexes of the grating strips are n, wherein n is equal to no, ne, or any value between no and ne.

3. The display panel according to claim 1, wherein each of the electrode structures comprises an electrode strip configured to load a positive electric signal, and an electrode strip configured to load a negative electric signal; and the electrode strip configured to load a positive electric signal and the electrode strip configured to load a negative electric signal are arranged alternately.

4. The display panel according to claim 1, wherein a sum of a thickness of each grating coupling structure and a thickness of each electrode structure is not greater than the width of each grating strip.

5. The display panel according to claim 4, wherein:

the thickness of each grating coupling structure ranges from 100 nm to 1 μm;

a material of each electrode structure is a transparent conductive material, and the thickness of each electrode structure ranges from 50 nm to 1000 nm; or each electrode structure is made of a metal material, and the thickness of each electrode structure ranges from 30 nm to 200 nm.

6. The display panel according to claim 1, wherein spacing between two adjacent ones of the electrode strips is less than spacing between the electrode strips and the upper substrate in a direction perpendicular to the upper substrate.

7. The display panel according to claim 1, wherein the display panel further comprises a buffer layer arranged between the waveguide layer and the lower substrate.

8. The display panel according to claim 7, wherein the buffer layer is in contact with the waveguide layer, and a refractive index of the buffer layer is less than the refractive index of the waveguide layer.

9. The display panel according to claim 7, wherein the buffer layer is in contact with the lower substrate, and a refractive index of the buffer layer is greater than a refractive index of the lower substrate.

10. The display panel according to claim 7, wherein a thickness of the buffer layer ranges from 50 nm to 10 μm.

11. The display panel according to claim 1, wherein a thickness of the waveguide layer ranges from 100 nm to 100 μm.

12. A display device, comprising the display panel according to claim 1, and a collimating backlight structure at least arranged on one side of the waveguide layer, wherein collimated backlight exit from the collimating backlight structure.

13. The display device according to claim 12, wherein the collimated backlight is light into which monochromatic light emitted from at least three types of monochromatic laser devices is mixed; or the collimated backlight is light into which monochromatic light emitted from at least three types of monochromatic light emitting diodes is mixed by a collimating structure; or the collimated backlight is white light, emitted by a white light emitting diode, which is collimated by the collimating structure; or the collimated backlight is collimated light into which light emitted by a strip-shaped cold cathode fluorescent lamp is collimated by the collimating structure.

14. The display device according to claim 13, wherein the collimated backlight is incident into the waveguide layer perpendicular to the side of the waveguide layer, or incident into the waveguide layer at an inclination angle satisfying a total reflection condition in the waveguide layer.

15. The display device according to claim 12, wherein refractive indexes of grating strips of the grating coupling structures are no;

the display device further comprises an alignment layer arranged on a surface of the upper substrate on a side thereof facing the liquid crystal layer, and/or on surfaces of the electrode structures on sides thereof facing the liquid crystal layer; and initial orientations of liquid crystal molecules in the liquid crystal layer are perpendicular to the upper substrate and the lower substrate.

16. The display device according to claim 12, wherein refractive indexes of grating strips of the grating coupling structures are ne, or any value between no and ne;

the display device further comprises an alignment layer arranged on a surface of the upper substrate on a side thereof facing the liquid crystal layer, and/or on surfaces of the electrode structures on sides thereof facing the liquid crystal layer, and a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light; and initial orientations of liquid crystal molecules in the liquid crystal layer are perpendicular to the upper substrate and the lower substrate.

17. The display device according to claim 12, wherein the display device further comprises an alignment layer arranged on a surface of the upper substrate on a side thereof facing the liquid crystal layer, and/or on surfaces of the electrode structures on sides thereof facing the liquid crystal layer, and a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light; and initial orientations of liquid crystal molecules in the liquid crystal layer are parallel to the upper substrate and the lower substrate.

18. The display device according to claim 12, wherein refractive indexes of grating strips of the grating coupling structures are any value between no and ne; and liquid crystal molecules in the liquid crystal layer are of a blue phase liquid crystal material.

19. The display device according to claim 12, wherein refractive indexes of grating strips of the grating coupling structures are no or ne;

liquid crystal molecules in the liquid crystal layer are of a blue phase liquid crystal material; and the display device further comprises a polarizer arranged on a surface of the upper substrate on a side thereof facing away from the liquid crystal layer, or a polarizing element arranged at a light emitting side of the collimating backlight structure, wherein the polarizing element is configured to enable the collimated backlight as collimated polarized light.

* * * * *